(No Model.)
C. SIEGHOLD.
OIL FEED FOR LAMPS.
No. 395,460. Patented Jan. 1, 1889.
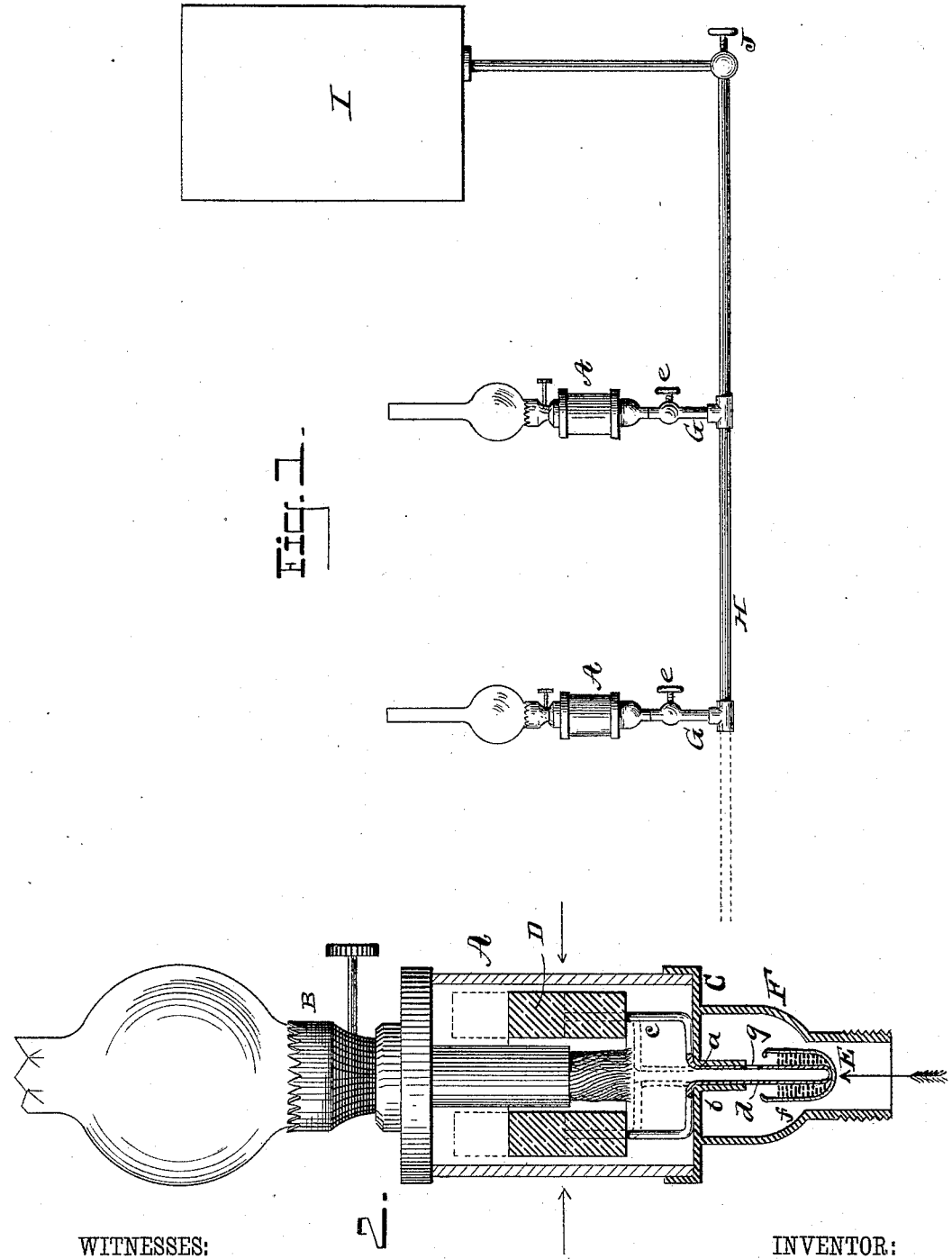
WITNESSES:
INVENTOR:
C. Sieghold
BY Munn & Co.
ATTORNEYS.

UNITED STATES PATENT OFFICE.

CHRISTIAN SIEGHOLD, OF SALINAS, CALIFORNIA.

OIL-FEED FOR LAMPS.

SPECIFICATION forming part of Letters Patent No. 395,460, dated January 1, 1889.

Application filed March 30, 1888. Serial No. 268,974. (No model.)

*To all whom it may concern:*

Be it known that I, CHRISTIAN SIEGHOLD, of Salinas, in the county of Monterey and State of California, have invented a new and Improved Oil-Feed for Lamps, of which the following is a specification, reference being had to the annexed drawings, forming a part thereof, in which—

Figure 1 is a side elevation of my improved oil-feed for lamps, and Fig. 2 is an enlarged vertical section of one of the lamps.

Similar letters of reference indicate corresponding parts in both views.

The object of my invention is to provide a simple and effectual device for uniformly supplying lamps with oil.

My invention consists in a lamp provided with a valve in the bottom thereof connected with a float contained by the body of the lamp and a pipe leading from the valve-opening to an oil-reservoir, all as hereinafter more fully described.

The lamp-body A is provided with a burner, B, of the usual description. The bottom C of the lamp is provided with a central aperture, $a$, furnished with the downwardly-projecting tube $b$. Within the lamp is placed an annular float, D, of cork or other light material, which is connected by the yoke $c$ and tube $d$ with the mercurial valve E, which is adapted to close the end of the tube $b$. The mercurial valve E consists of a cup, $f$, attached to the lower end of the tube $d$ and partly filled with mercury. The cup $f$, when carried upwardly by the float D, brings the mercury into contact with the lower end of the tube $b$, and thus closes the tube, so that no oil can pass. In the tube $d$ is formed an aperture, $g$, through which oil passes to the lamp. The valve and tube $b$ are inclosed in a chamber, F, formed on the bottom of the lamp, and the said chamber F communicates by a pipe, G, with the supply-pipe H. In the pipe G is a valve, $e$, for shutting off the flow of oil to the lamp.

The supply-pipe H communicates with an oil-reservoir, I, arranged above the level of the lamps. Any desired number of lamps may be connected with the pipe H, and the supply of oil to the pipe H is regulated by the valve J.

When the oil in any one of the lamps is at its normal level, the float D is borne upward, holding the mercury in the cup $f$ against the end of the tube $b$; but when the oil burns away, so as to reduce its level, the float and the valve drop by their own gravity, and oil enters the lamp through the opening $g$ until the oil in the lamp reaches the normal level, when the float D again presses the valve E, thereby shutting off the oil-supply to that lamp.

Having thus described my invention, I claim as new and desire to secure by Letters Patent—

1. The combination, with the lamp body or vessel A, having an inlet in its bottom, of the float D within the body, a depending tube, $d$, extending down through the said inlet, and having an opening, $g$, through one side and a cup on its lower closed end, substantially as set forth.

2. The combination, with a lamp-body, A, having a depending tube, $b$, of a float, D, within the body, a pipe, $d$, closed at its lower end, suspended from the float, passing down through the tube $b$, and provided in its side with an opening, $g$, said opening being below the lower end of the tube $b$ when the float is lowered, substantially as set forth.

CHRISTIAN SIEGHOLD.

Witnesses:
ED. ROSSI,
HIRAM D. TUTTLE.